(12) United States Patent
Schoen et al.

(10) Patent No.: US 9,731,840 B2
(45) Date of Patent: Aug. 15, 2017

(54) AIRCRAFT INTERIOR LIGHT UNIT AND METHOD OF OPERATING AN AIRCRAFT INTERIOR LIGHT UNIT

(71) Applicant: Goodrich Lighting Systems GmbH, Lippstadt (DE)

(72) Inventors: Christian Schoen, Mainz (DE); Bjoern Schallenberg, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/210,167

(22) Filed: Jul. 14, 2016

(65) Prior Publication Data

US 2017/0015436 A1    Jan. 19, 2017

(30) Foreign Application Priority Data

Jul. 17, 2015 (EP) .................................... 15177242

(51) Int. Cl.
| | |
|---|---|
| *F21V 8/00* | (2006.01) |
| *G06F 17/50* | (2006.01) |
| *B64D 47/02* | (2006.01) |
| *G02B 6/00* | (2006.01) |
| *G09F 9/302* | (2006.01) |

(Continued)

(52) U.S. Cl.
CPC .............. *B64D 47/02* (2013.01); *B64D 11/00* (2013.01); *F21V 3/00* (2013.01); *G02B 6/00* (2013.01); *G02B 6/0043* (2013.01); *G02B 6/0055* (2013.01); *G09F 9/302* (2013.01); *G09F 9/33* (2013.01); *G09F 13/04* (2013.01); *G09F 13/10* (2013.01); *G09F 13/18* (2013.01); *G09F 13/22* (2013.01); *G09F 21/10* (2013.01); *B64D 2203/00* (2013.01); *F21Y 2115/10* (2016.08); *G09F 13/16* (2013.01); *G09F 2013/049* (2013.01); *G09F 2013/1831* (2013.01); *G09F 2013/222* (2013.01); *G09F 2013/227* (2013.01)

(58) Field of Classification Search
CPC .... B64D 2203/00; B64D 47/02; B64D 47/06; B64D 47/04; B64D 11/00; B64D 2011/0038; B64D 2045/007; B64D 45/00; B64D 2011/0053
USPC ............................................. 40/544; 362/612
See application file for complete search history.

(56) References Cited

U.S. PATENT DOCUMENTS

| | | | |
|---|---|---|---|
| 6,375,335 B1 * | 4/2002 | Tabata | G02B 6/002 362/23.09 |
| 7,254,309 B1 | 8/2007 | Chou et al. | |

(Continued)

FOREIGN PATENT DOCUMENTS

| | | |
|---|---|---|
| EP | 2485073 A2 | 8/2012 |
| JP | 2004325530 A | 11/2004 |
| WO | 2010052605 A1 | 5/2010 |

OTHER PUBLICATIONS

European Search Report for Application No. 15177242.3-1801 Mailed Jan. 27, 2016; 11 Pages.

*Primary Examiner* — Shin Kim
(74) *Attorney, Agent, or Firm* — Cantor Colburn LLP (57) ABSTRACT

An aircraft interior light unit having a light output over an extended light emission area includes a flat light distribution body having a front surface, through which the light output is coupled out, and a back surface, wherein at least one of the front surface and the back surface of the flat light distribution body has a plurality of surface irregularities.

15 Claims, 6 Drawing Sheets

(51) Int. Cl.
*G09F 9/33* (2006.01)
*G09F 13/04* (2006.01)
*G09F 13/18* (2006.01)
*G09F 21/10* (2006.01)
*B64D 11/00* (2006.01)
*F21V 3/00* (2015.01)
*G09F 13/10* (2006.01)
*G09F 13/16* (2006.01)
*G09F 13/22* (2006.01)
*F21Y 115/10* (2016.01)

(56) References Cited

U.S. PATENT DOCUMENTS

| | | | | |
|---|---|---|---|---|
| 7,690,810 | B2* | 4/2010 | Saitoh | G02B 5/045 |
| | | | | 362/244 |
| 8,011,818 | B2* | 9/2011 | Negley | G02B 6/0011 |
| | | | | 362/230 |
| 8,033,706 | B1* | 10/2011 | Kelly | G02B 6/0036 |
| | | | | 362/307 |
| 8,746,943 | B2 | 6/2014 | Brukilacchio | |
| 8,870,429 | B2 | 10/2014 | Kim et al. | |
| 8,950,923 | B2* | 2/2015 | Minami | G02B 6/0043 |
| | | | | 362/612 |
| 2001/0053071 | A1 | 12/2001 | Yoda et al. | |
| 2003/0235055 | A1* | 12/2003 | Lodhie | B64D 47/02 |
| | | | | 362/470 |
| 2005/0259439 | A1* | 11/2005 | Cull | G09G 3/3413 |
| | | | | 362/612 |
| 2007/0183156 | A1* | 8/2007 | Shan | B60Q 1/2611 |
| | | | | 362/277 |
| 2008/0062116 | A1* | 3/2008 | Morbieu | G02F 1/133603 |
| | | | | 345/102 |
| 2008/0308824 | A1 | 12/2008 | Shchekin et al. | |
| 2009/0154194 | A1* | 6/2009 | Hadlich | H01L 33/44 |
| | | | | 362/612 |
| 2010/0019689 | A1* | 1/2010 | Shan | G09F 9/33 |
| | | | | 315/294 |
| 2013/0016525 | A1* | 1/2013 | Metzech | B64D 11/0015 |
| | | | | 362/602 |
| 2014/0198500 | A1* | 7/2014 | Tessnow | F21V 13/04 |
| | | | | 362/245 |
| 2014/0307447 | A1* | 10/2014 | Ohta | F21K 9/60 |
| | | | | 362/311.02 |
| 2015/0146453 | A1* | 5/2015 | Sakai | G02B 6/0055 |
| | | | | 362/612 |
| 2016/0195666 | A1* | 7/2016 | Srinivasamurthy | G02B 6/0043 |
| | | | | 362/612 |

* cited by examiner

AIRCRAFT INTERIOR LIGHT UNIT AND METHOD OF OPERATING AN AIRCRAFT INTERIOR LIGHT UNIT

FOREIGN PRIORITY

This application claims priority to European Patent Application No. 15 177 242.3 filed Jul. 17, 2015, the entire contents of which is incorporated herein by reference.

TECHNICAL FIELD

The present invention is in the field of interior aircraft lighting. In particular, the present invention is in the field of aircraft interior light units that convey information to the passengers and/or aircrew within the aircraft, i.e. to signalling light units.

BACKGROUND

In modern aircraft, there are many light units that are used as signals. Examples are fasten seat belt signs, washroom usage signs, i.e. signs indicating if a washroom is busy/not busy, and non-smoking signs. These signs are generally small, stationary and dedicated to one particular piece of signalling information. In other words, existing interior signalling light units do not provide for much flexibility in terms of placing the light units in the interior of the aircraft and in terms of designing the overall interior lighting concept of an aircraft.

Accordingly, it would be beneficial to provide an aircraft interior light unit that provides for increased flexibility in arranging signalling lighting over the interior of the aircraft.

SUMMARY

Exemplary embodiments of the invention include an aircraft interior light unit having a light output over an extended light emission area. The aircraft interior light unit comprises a flat light distribution body having a front surface, through which the light output is coupled out, and a back surface, wherein at least one of the front surface and the back surface of the flat light distribution body has a plurality of surface irregularities; at least one general illumination LED positioned at a lateral outside of the flat light distribution body, with light emitted by the at least one general illumination LED being coupled into the flat light distribution body and being propagated within the flat light distribution body via total internal reflection at the front and back surfaces and with light from the at least one general illumination LED being re-directed at the plurality of surface irregularities for being coupled out of the flat light distribution body and for providing a general illumination over the extended light emission area; a plurality of signalling LEDs being arranged outside of the flat light distribution body and facing towards the back surface of the flat light distribution body; and a translucent panel arranged between the back surface of the flat light distribution body and the plurality of signalling LEDs, with light emitted from the plurality of signalling LEDs passing through the translucent panel and the flat light distribution body, forming high luminance spots in the light output.

Exemplary embodiments of the invention allow for the combination of general illumination light units with signalling light units in the interior of an aircraft. In other words, extended lighting panels that were previously used for the general illumination of the cabin only can be additionally provided with visual signalling capabilities that allow for conveying information to the passengers and/or air crew. Depending on the particular information to be conveyed, the signalling LEDs may be arranged behind the translucent panel in such a way that the resulting high luminance spots form a visual signal to the passengers and/or air crew. For example, the high luminance spots may jointly form a sign, such as a non-smoking sign, or may form letters that convey information to the passengers, such as safety instructions. As will be described in greater detail below, the conveyed information may be preset for a given light unit. However, it is also possible that one light unit is able to convey different kinds of information, depending on the controlling of the signalling LEDs. Exemplary embodiments of the invention allow for conveying information to the passengers and/or air crew in a manner that is independent from the previously used small and constrained signalling light units and that is independent from the inflight entertainment monitors of an aircraft. Rather, the space and locations of general cabin illumination light units may be additionally used for signalling purposes.

The plurality of signalling LEDs may be operated independently from the at least one general illumination LED. In this way, the aircraft interior light unit may be used as a general cabin illumination light unit, but may also be used for signalling purposes upon the switching on of the signalling LEDs. Accordingly, time-varying information, such as the fasten seat belt instructions and the washroom busy/non busy indication, can be displayed in a time-selective manner.

The high luminance spots in the light output, generated by the plurality of signalling LEDs, are spots of high brightness, as compared to the light emitted by the aircraft interior light unit when only the at least one general illumination LED is operated. The term high luminance is intended to refer to a luminance that is significantly higher than the luminance emitted by the aircraft interior light unit generated by the at least one general illumination LED only. In particular, each of the high luminance spots may have a luminance that is at least twice as high as the luminance across the extended light emission area upon operation of the at least one general illumination LED only.

The flat light distribution body is a light guide plate that allows for propagation of light therein by a total internal reflection. The front surface and the back surface of the flat light distribution body form the opposite sides of the flat light distribution body, between which the total internal reflection and the propagation of the light occurs. Via the provision of the surface irregularities, a coupling out of the light out of the light guide plate is made possible.

The term flat light distribution body is used for a structure that has extensions in two dimensions that are significantly greater than the extension in a third dimension. The front and back surfaces are those surfaces that extend in those planes comprising the two dimensions of greater extension. In the case of the flat light distribution body being a substantially cuboid structure, the front and back surfaces are those surfaces that have the greatest surface area. It is pointed out that the flat light distribution body does not have to be cuboid. Rather, the flat light distribution body can have any other suitable geometric shape, such as a circular, oval, polygonal or other regular or irregular shape. The term flat just specifies that the extension of the flat light distribution body is smaller in one dimension as compared to the two other dimensions in a Cartesian coordinate system.

The term total internal reflection refers to the arriving of light rays at the front or back surface at an angle that is larger than the critical angle of the material discontinuity present at the front and back surfaces. As a result of the angle of incidence being larger than the critical angle, the light rays are completely reflected and stay within the flat light distribution body. In this way, the light rays propagate within the flat light distribution body from total internal reflection to total internal reflection. The surface irregularities are structures that alter the light path in a manner different from total internal reflection at a plane surface. In particular, light arriving at a surface irregularity at an angle of incidence with respect to the surface, at which the surface irregularity is present, is reflected at an angle of reflection that is different from the angle of incidence with respect to the surface, at which the surface irregularity is present. Due to this difference between the angle of incidence and the angle of reflection in the macroscopic framework of the surfaces of the flat light distribution body, a coupling out of the light after hitting a surface irregularity is achieved.

The translucent panel is arranged between the back surface of the flat light distribution body and the plurality of signalling LEDs. In particular, the translucent panel may be arranged along the back surface of the flat light distribution body, with an optional air gap being present therebetween. In particular, the translucent panel may be a sheet-like translucent panel. Being translucent, the translucent panel allows for the passing of some, but not all of the light emitted by the plurality of signalling LEDs. In this way, the translucent panel is a convenient means of adapting the brightness level of the high luminance spots, as compared to the general illumination, for a particular application. Further, the translucent panel may diffuse the light emitted by the plurality of signalling LEDs, thus ensuring that the individual LEDs are not discernable by the human eye. Rather, the high luminance spots are perceived as extended structures.

The front surface of the flat light distribution body may coincide with the extended light emission area. However, it is also possible that a part of the front surface forms the extended light emission area. Conversely, it is possible that the extended light emission area has a larger extension than the front surface of the flat light distribution body.

According to a further embodiment, the back surface of the flat light distribution body has a plurality of surface irregularities, with light from the at least one general illumination LED being re-directed at the plurality of surface irregularities of the back surface for being coupled out of the flat light distribution body at the front surface thereof. In other words, light from the at least one general illumination LED is coupled out of the front surface of the flat light distribution body after hitting a surface irregularity at the back surface of the flat light distribution body. In this way, the general illumination over the extended light emission area of the aircraft interior light unit can be conveniently achieved with the provision of surface irregularities at the back surface only. However, it is pointed out that such surface irregularities at the back surface are not necessary or can be combined with surface irregularities at the front surface, as will be explained below.

According to a further embodiment, the translucent panel is reflective on its side facing the flat light distribution body and the front surface of the flat light distribution body has a plurality of surface irregularities, with light from the at least one general illumination LED being re-directed at the plurality of surface irregularities of the front surface for being coupled out of the flat light distribution body at the back surface thereof, for being reflected as the translucent panel, and for being passed through the flat light distribution body and out of the front surface thereof. In other words, a coupling out of light out of the front surface can also be achieved by redirecting the light at the front surface towards the back surface and by reflecting the light at the translucent panel after leaving the flat light distribution body at its back surface. From there, the light re-enters the flat light distribution body, passes therethrough, and re-exists the flat light distribution body at the front surface, contributing to the light output over the extended light emission area. It is pointed out that the translucent panel being reflective does not necessarily mean that all light coming from the flat light distribution body is reflected. It is possible that the translucent panel is partly reflective on its side facing the flat light distribution body, reflecting only a portion of the light arriving from the flat light distribution body. It is further pointed out that the two mechanisms described above, namely the generation of the light output via surface irregularities at the back surface and the generation of light output via the surface irregularities at the front surface in combination with the reflection at the translucent panel, can be combined to any desired extent.

According to a further embodiment, the translucent panel is a diffuse reflector, in particular a white diffuse reflector, on its side facing the flat light distribution body. As a diffuse reflector, the side of the translucent panel facing the flat light distribution body contributes to distributing the light output of the aircraft interior light unit and to evening out the level of illumination across the extended light emission area. As a white reflector, the translucent panel may reflect a large portion of the light coming from the flat light distribution body, contributing to a high efficiency of the general illumination functionality of the aircraft interior light unit.

According to a further embodiment, the translucent panel diffusely passes light emitted by the plurality of signalling LEDs. In this way, the translucent panel broadens the output light intensity distributions of the signalling LEDs, making the LEDs not discernable as such to the human observer and giving the high luminance spots in the light output a more pleasing appearance to the human eye.

According to a further embodiment, the high luminance spots have an extension of at least 2 mm, in particular of between 5 mm and 10 mm, in the extended light emission area. In this way, the high luminance spots have a size that can be illuminated well by a single LED and that are at the same time pleasing to the human eye due to their extension.

According to a further embodiment, the translucent panel passes between 1% and 10%, in particular between 2% and 5%, of the light emitted by the plurality of signalling LEDs. In other words, between 1% and 10%, in particular between 2% and 5%, of the light from the plurality of signalling LEDs reaches the flat light distribution body and is then passed on to contributing to the light output of the aircraft interior light unit. In this way, it is ensured that the high luminance spots are not perceived with a disturbingly high intensity in the light output.

According to a further embodiment, a luminance of the high luminance spots in the light output is between 2 times and 10 times as high as a luminance generated by the at least one general illumination LED in the light output. In other words, the luminance in the light output, generated by the signalling LEDs, is between 2 times and 10 times as high as the luminance generated for the purpose of general illumination. In this way, the high luminance spots are perceived as such by the passengers and/or air crew without being blinding, as compared to the level of general illumination.

According to a further embodiment, the translucent panel is made of rigid foam material. Rigid foam material is a readily available material that passes a suitable amount of light from the signalling LEDs towards the flat light distribution body and that has a diffusing effect on the light passed.

According to a further embodiment, the translucent panel has a thickness of between 0.1 mm and 5 mm, in particular of between 0.5 mm and 2 mm.

According to a further embodiment, a distribution of the plurality of surface irregularities is such that a luminance distribution of the light output across the extended light emission area, generated by the at least one general illumination LED, has a ratio between its maximum luminance value and its minimum luminance value of at most 3. In this way, a fairly even luminance distribution across the extended light emission area of the aircraft interior light unit is achieved, which provides for a uniform perception of the extended light emission area by the human eye. In order to achieve such ratio, the surface irregularities may be distributed in a non-uniform manner, and the intensity of the surface irregularities may vary significantly over different parts of the respective surface. The exact locations of the surface irregularities may depend on the extension of the flat light distribution body, on the number and position(s) of the at least one general illumination LED, and on the structure and geometry of the surface irregularities. Suitable positions of the surface irregularities for a particular application may be found via iterative simulations.

According to a further embodiment, the plurality of surface irregularities comprises surface holes and/or the plurality of surface irregularities comprises dots attached to the at least one of the front and back surfaces. Such holes may be drilled or milled into the flat light distribution body during the manufacture thereof. It is also possible that the surface irregularities are created by counter sinking, counter boring, etching or any other suitable kind of operation. It is also possible that a mechanical force is exerted onto the material of the flat light distribution body at selected locations, leading to the holes in the respective surface. The holes may also be preferred as dents. The dots may be glued onto the respective surface or may be printed thereon. Such dots may be of any suitable material that effects a change between the angle of incidence and the angle of reflection at the surface irregularity.

According to a further embodiment, the diameter of the plurality of surface irregularities may be between 0.1 mm and 2 mm, in particular between 0.2 mm and 1.5 mm. The plurality of surface irregularities may be round or oval or polygonal or may have any other suitable form.

According to a further embodiment, the flat light distribution body may have at least one light entry surface. Each of the at least one general illumination LED may be arranged facing towards a respective light entry surface. The light entry surface may have a concave shape, when seen from the general illumination LED, in a cross-sectional plane parallel to the front and back surfaces. In this way, a large portion of the light emitted by the general illumination LED can be coupled into the flat light distribution body. It is possible that only a small portion of the light of the general illumination LED or no light emitted by the general illumination LED is reflected by the flat light distribution body, leading to an overall high efficiency of the aircraft interior light unit with respect to the general illumination capabilities. Additionally/alternatively, the light entry surface may have a convex shape, when seen from the general illumination LED, in a cross-sectional plane orthogonal to the front and back surfaces. In this way, a large portion or all of the light emitted by the general illumination LED may be refracted at the convex shaped light entry surface in such a way that it then hits the front and back surfaces at angles above the critical angle, leading to total internal reflection of the light. In particular, the light may be refracted in a way that all light entering the flat light distribution body is subject to total internal reflection thereafter.

According to a further embodiment, the plurality of signalling LEDs are arranged in a set manner such that the high luminance spots convey predetermined signalling information to an aircraft passenger and/or aircraft crew member upon operation of the plurality of signalling LEDs. In other words, the arrangement of the signalling LEDs determines the information to be conveyed. While it is possible that multiple pieces of information may be conveyed in this framework, such as an open seat belt sign and a closed seat belt sign, which may be displayed at different points in time, no adaptive changing of the signalling content can be achieved. However, the limited number of pieces of preset signalling information can be included into a general illumination light unit in a very efficient manner.

According to an alternative embodiment, the plurality of signalling LEDs are arranged in a grid and the plurality of signalling LEDs are individually controllable, with the aircraft interior light unit being capable of providing different signalling information to an aircraft passenger and/or aircraft crew member via selective operation of different subsets of the plurality of signalling LEDs. In other words, the aircraft interior light unit may be a dynamic aircraft interior light unit in that it is capable of emitting different signals at different points in time, with the signals not being restricted to a preset number of signals due to a set arrangement of the signalling LEDs, but with the signals being adjustable in an arbitrary manner via an adjustable operation of the grid of signalling LEDs. The aircraft interior light unit may have a control unit that is configured to receive command signals and that is further configured to operate different subsets of the plurality of signalling LEDs at different points in time as a response to the command signals. For example, the control unit may receive a particular text to be displayed via the command signal and may display these words in a ticker format, i.e. as letters running from one side of the light unit to the other. It is apparent that a huge variety of different signals can be displayed via such a grid of individually controllable signalling LEDs.

According to a further embodiment, the extended light emission area of the aircraft interior light unit has a size of between 0.1 m2 and 3 m2, in particular of between 0.5 m2 and 1.5 m2.

According to a further embodiment, the high luminance spots form at least one of a washroom usage sign, a fasten seat belt sign, a non-smoking sign and a letter arrangement. In other words, the plurality of signalling LEDs may be controlled in such a manner in operation that the resulting high luminance spots form a sign, conveying information to the passengers/air crew, or form some sort of text for conveying information to the passengers/air crew. It is also possible that the high luminance spots form different kinds of signs and/or different kinds of letter arrangements at different points in time, depending on the time-selective control of the plurality of signalling LEDs.

Exemplary embodiments of the invention further include an aircraft, such as an air plane or a helicopter, having at least one aircraft interior light unit, as described in any of the embodiments above, disposed in an interior of the aircraft for providing general illumination and for conveying signalling information to an aircraft passenger and/or aircraft crew member. The modifications, additional features, and effects described above with respect to the aircraft interior light unit are analogously applicable to the aircraft.

Exemplary embodiments of the invention further include a method of operating an aircraft interior light unit having a flat light distribution body with a front surface and a back surface, wherein at least one of the front surface and the back surface has a plurality of surface irregularities, at least one general illumination LED positioned at a lateral outside of the flat light distribution body, a plurality of signalling LEDs arranged outside of the flat light distribution body and facing towards the back surface thereof, and a translucent panel arranged between the back surface of the flat light distribution body and the plurality of signalling LEDs. The method comprises the steps of providing a general illumination over an extended light emission area by operating the at least one general illumination LED, with light from the at least one general illumination LED being coupled into the flat light distribution body, being propagated therein via total internal reflection, and being re-directed at the plurality of surface irregularities for being coupled out of the flat light distribution body; and providing signalling information to an aircraft passenger and/or air crew member by operating the plurality of signalling LEDs, with light emitted from the plurality of signalling LEDs passing through the translucent panel and the flat light distribution body, forming high luminance spots that jointly contain the signalling information. The modifications, additional features, and effects described above with respect to the aircraft interior light unit are applicable to the method of operating an aircraft interior light unit in an analogous manner. Method steps corresponding to those modifications and additional features are explicitly disclosed herewith.

BRIEF DESCRIPTION OF THE DRAWINGS

Further exemplary embodiments of the invention are described with reference to the accompanying Figures, wherein.

DETAILED DESCRIPTION

Figure 1:
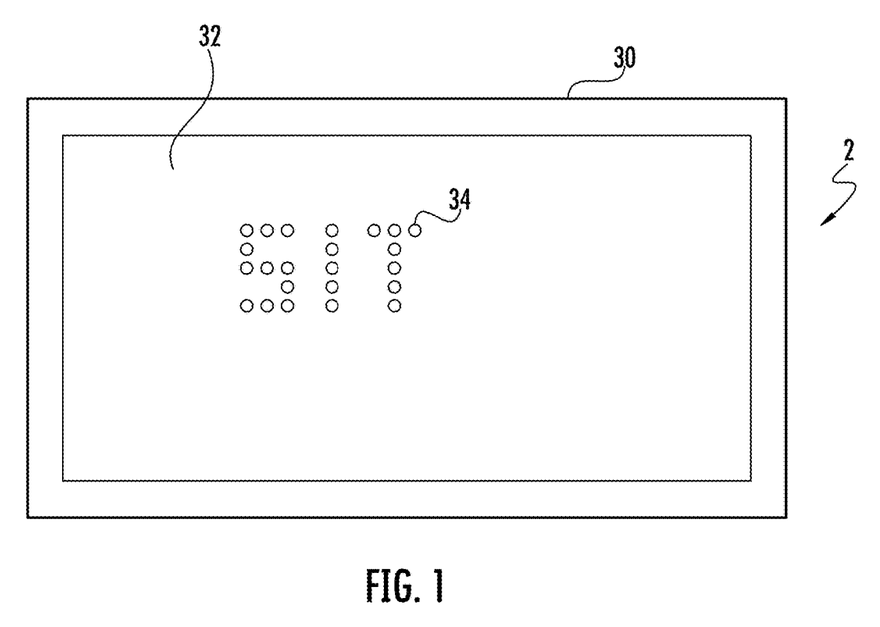
FIG. 1 shows a front view of an aircraft interior light unit in accordance with an exemplary embodiment of the invention.

FIG. 1 shows an aircraft interior light unit 2 in accordance with an exemplary embodiment of the invention in a front view. The front view shows the aircraft interior light unit 2, as seen by passengers and/or aircrew members that are located in the interior of the aircraft, e.g. in an air plane cabin. In the viewing direction of FIG. 1, the aircraft interior light unit 2 has a housing 30 and an extended light emission area 32 that are visible to the passengers/air crew. In the front view of FIG. 2, the housing 30 forms a frame around the extended light emission area 32. In operation, the extended light emission area 32 is illuminated, with the light output of the aircraft interior light unit 2 thus providing for a general illumination of the aircraft cabin.

Besides providing for the general illumination of the aircraft cabin, the aircraft interior light unit 2 is capable of providing signalling information to the passengers/air crew. This signalling information is provided via high luminance spots 34. In the depicted exemplary operating state of FIG. 1, the illuminated high luminance spots 34 form the word "SIT", signalling the passengers/air crew to take their seats. It is apparent that the aircraft interior light unit 2 may convey the signalling information to the passengers/air crew in a more polite way, e.g. with the high luminance spots forming the phrase "Please Take Your Seat" or similar. However, for illustrative purposes, the short word "SIT" is depicted in FIG. 1. In the depicted operating state, the aircraft interior light unit 2 provides both for a general illumination of the aircraft cabin via the extended light emission area 32 as well as for conveying signalling information via the high luminance spots 34. The aircraft interior light unit 2 is a combined general illumination and signalling light unit.

Figure 2:
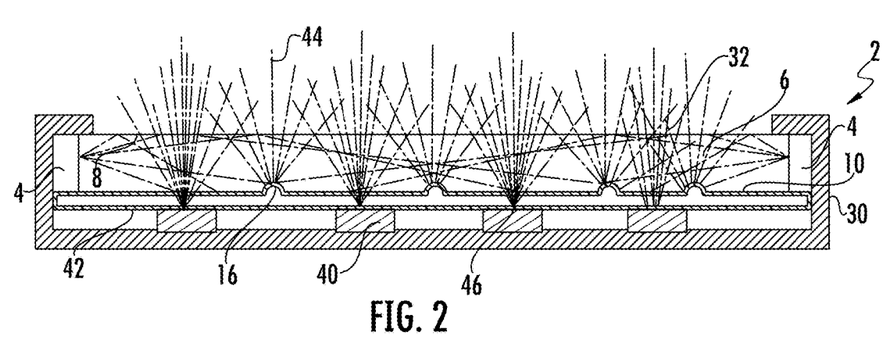
FIG. 2 shows a cross-sectional view through an aircraft interior light unit in accordance with another exemplary embodiment of the invention.

In FIG. 2, a horizontal cross-sectional view through an aircraft interior light unit 2 in accordance with another exemplary embodiment of the invention is depicted. The aircraft interior light unit 2 of FIG. 2 is similar to the aircraft interior light unit 2 of FIG. 1. Within the housing 30, two general illumination LEDs 4, a flat light distribution body 6, a translucent panel 42, and a plurality of signalling LEDs 40 are arranged. Of the plurality of signalling LEDs 40, four signalling LEDs 40 are depicted in the schematic illustration of FIG. 2. It is apparent that a much larger number of such signalling LEDs may be present in order to convey signalling information with a higher resolution, as for example depicted in FIG. 1. Accordingly, FIG. 2 must be understood in a schematic manner in order to illustrate the working principals of the aircraft interior light unit 2.

The housing 30 forms the back side of the aircraft interior light unit 2 as well as the lateral sides thereof, i.e. it forms the depicted left and right sides as well as the non-depicted top and bottom sides of the aircraft interior light unit 2. Further, the housing 30 extends to some extent along the edges of the front of the aircraft interior light unit 2, shown towards the top in FIG. 2, thus forming the frame-like structure depicted in FIG. 1.

The signalling LEDs 40 are mounted to the back side of the housing 30. Although only four signalling LEDs 40 are depicted for illustrative purposes, the aircraft interior light unit 2 comprises a grid of signalling LEDs 40 that are individually controllable and can be operated in arbitrary subsets. Adjacent to the signalling LEDs 40 and parallel to the back side of the housing 30, the translucent panel 42 is arranged across the entire extension of the housing 30. The translucent panel 42 splits the inside of the housing 30 into a front portion and into a back portion, with the signalling LEDs 40 being arranged in the back portion. In the front portion of the housing 30, the flat light distribution body 6 and the two general illumination LEDs 4 are disposed.

The general illumination LEDs 4 are positioned towards the right and left of the flat light distribution body 6 in the exemplary embodiment of FIG. 2. The flat light distribution body 6 has a front surface 8 and a back surface 10. The back surface 10 is arranged adjacent to the translucent panel 42, with an air gap therebetween. The front surface 8 forms a part of the front of the aircraft interior light unit 2. In particular, a part of the front surface 8 is directly adjacent to the front portion of the housing 30, while the remainder of the front surface 8 forms the extended light emission area 32 of the aircraft interior light unit 2. It is pointed out that it is also possible that an additional lens cover is arranged over the front surface 8 of the flat light distribution body 6. The back surface 10 has a plurality of surface irregularities 16, of which four are depicted for illustrative purposes.

The functioning of the aircraft interior light unit 2 will now be described with the help of exemplary light rays depicted in FIG. 2. The general illumination LEDs 4 emit light rays that are coupled into the flat light distribution body 6 and that propagate therethrough via total internal reflection. When such light rays hit one of the plurality of surface irregularities 16, they are re-directed in a manner that is different from the total internal reflection at the remainder of the front and back surfaces 8 and 10. After hitting such a surface irregularity 16, the light rays are redirected in such a manner that they do no longer experience total internal reflection afterwards. In particular, after hitting one of the surface irregularities 16 of the back surface 10, the re-directed light rays exit the flat light distribution body 6 through the front surface 8 thereof, as illustrated by exemplary light rays 44. Through the surface irregularities, the light from the general illumination LEDs 4 is distributed over the extended light emission area 32, providing for a general illumination across the same.

In contrast thereto, the light emitted by the signalling LEDs 40 partly passes through the translucent panel 42, before passing through the flat light distribution body 6 and leaving the aircraft interior light unit 2 at the front surface 8 thereof. This is illustrated by exemplary light rays 46. The light emitted by the signalling LEDs 40 only partly passes the translucent panel 42, because the translucent panel 42 is of a material that does not pass all light, but only portions thereof through to the other side.

It is pointed out that additional surface irregularities could be provided at the front surface 8, with the light from the general illumination LEDs being redirected at those surface irregularities towards the back surface 10, before being reflected by the translucent panel 42 and being emitted from the flat light distribution body at the front surface 8 after this reflection and after passing through the flat light distribution body 6 again. For this purpose, the translucent panel may be a white diffuse reflector at its side facing the flat light distribution body 6. It is moreover possible that no surface irregularities are present at the back surface 10 and that all surface irregularities are present at the front surface 8.

It is further pointed out that the light rays 46, generated by the signalling LEDs 40, produce high luminance spots at the front surface 8, when seen from the outside of the aircraft interior light unit 2, i.e. they produce high luminance spots in the light output at the extended light emission area 32. These high luminance spots have a luminance value that is between two times and ten times as high as the highest luminance value across the extended light emission area 32, when the signalling LEDs 40 are switched off. In this way, the high luminance spots are clearly discernable by the human eye. With the grid of signalling LEDs 40 being present behind the entire translucent panel 42, a selected operation of different subsets of the signalling LEDs 40 can be used for generating arbitrary signalling information to be presented to the passengers and/or air crew.

Figure 3:
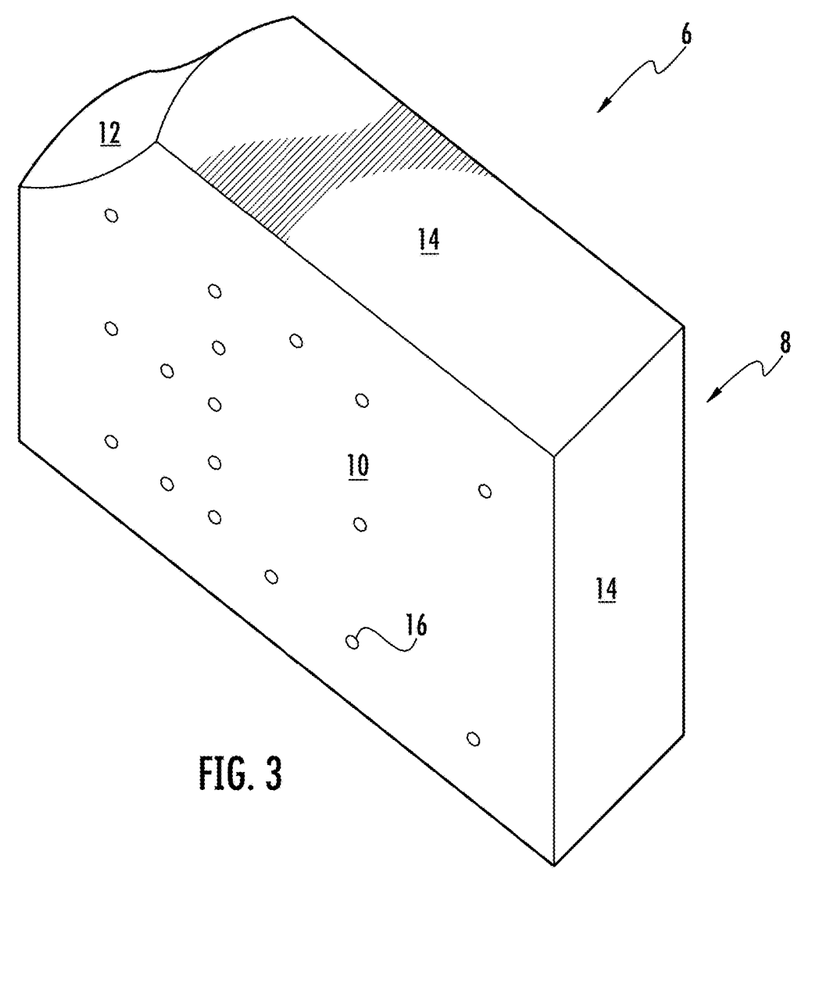
FIG. 3 shows an exemplary flat light distribution body to be used with aircraft interior light units in accordance with exemplary embodiments of the invention.

FIG. 3 shows an exemplary flat light distribution body 6, to be used in aircraft interior light units in accordance with exemplary embodiments of the invention, in a perspective view. The flat light distribution body 6 is a substantially cuboid body of Poly(methylmetacrylate), also referred to as PMMA. The flat light distribution body 6 may also be of other materials, such as polycarbonate, glass or any other suitable material. The flat light distribution body 6 is entirely cuboid, with the exception of a light entry surface 12, which will be described in greater detail below.

The flat light distribution body 6 has a front surface 8 and a back surface 10, which is opposite of the front surface 8. The front surface 8 is not visible in the viewing direction of FIG. 3. Between the front and back surfaces 8, 10, a connection surface 14 and the light entry surface 12 are provided. The connection surface 14 surrounds the cuboid structure between the front and back surfaces 8, 10, with the exception of the light entry surface 12. In other words, the connection surface 14 comprises all surfaces of the flat light distribution body 6 that are not the front and back surfaces 8, 10 and are not the light entry surface 12. In the exemplary embodiment of FIG. 3, the extension of the front and back surfaces 8, 10 is much greater both in a width and a height dimension than the distance between the front and back surfaces 8, 10. In this way, the light distribution body can be considered an overall flat structure.

The back surface 10 has a plurality of surface irregularities 16. The plurality of surface irregularities 16 are distributed across the back surface 10 in a non-uniform manner, which will be described in greater detail below. In the exemplary embodiment of FIG. 3, the surface irregularities 16 all have a round shape and all have the same size. It is, however, also possible that the surface irregularities 16 have different shapes and/or differ in size.

It is pointed out that the light entry surface 12 may be at a different position of the flat light distribution body 6. Also, it is possible that two or more light entry surfaces are provided. It is further possible that there is no dedicated light entry surface, but that the connection surface is a continuous surface around the flat light distribution body 6. The coupling in of the light, which will be described below, may also happen at a flat lateral surface.

It is further pointed out that the surface carrying the surface irregularities is the front surface and that the other surface is the back surface, i.e. that front and back surfaces are switched.

Figure 4A:
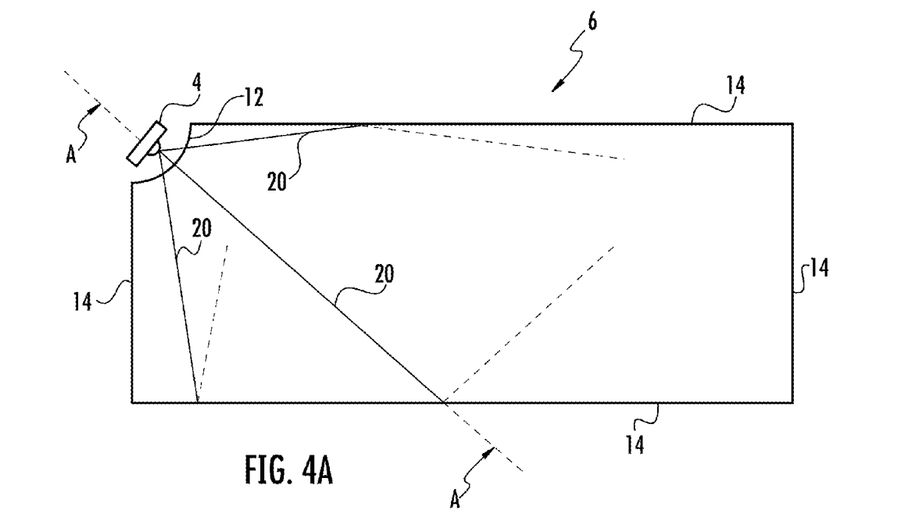
FIG. 4A-FIG. 4B shows two cross-sectional views through the flat light distribution body of FIG. 3, illustrating the light distribution taking place therein; and FIG. 5A

In order to illustrate the light distribution functionality of the flat light distribution body 6 of FIG. 3, two cross-sectional views through the flat light distribution body 6 of FIG. 3 are shown in FIG. 4. FIG. 4*a* shows a cross-sectional plane that is parallel to the front and back surfaces 8, 10 and is between the front and back surfaces 8, 10. FIG. 4*a* shows both the flat light distribution body 6 and a general illumination LED 4 that couples light into the flat light distribution body 6, which light is distributed therein.

The general illumination LED 4 is arranged in a way that it faces the light entry surface 12. In particular, it is arranged in the space that is cut out of the hypothetical outline of the flat light distribution body 6, if it were entirely cuboid. In the viewing plane of FIG. 4*a*, the general illumination LED 4 is arranged in the top left corner of the flat light distribution body 6.

The connection surface 14, which surrounds the flat light distribution body 6 with the exception of the light entry surface 12, comprises a reflective coating, such that all light hitting the connection surface 14 from within the flat light distribution body 6 experiences reflection at the connection surface 14. The light entry surface 12 has a concave shape in the cross-sectional plane of FIG. 4*a*, when seen from the general illumination LED 4. In this way, the light entry surface 12 surrounds the general illumination LED 4 and provides a large surface for coupling the light of the general illumination LED 4 into the flat light distribution body 6.

In FIG. 4a, there are depicted three exemplary light rays 20. These light rays 20 illustrate that light emitted by the general illumination LED 4 in very different directions is coupled into the flat light distribution body 6 via the light entry surface 12. All the light of the light rays 20 is trapped within the flat light distribution body 6, experiencing reflection when hitting the reflective connection surface 14.

Figure 4B:
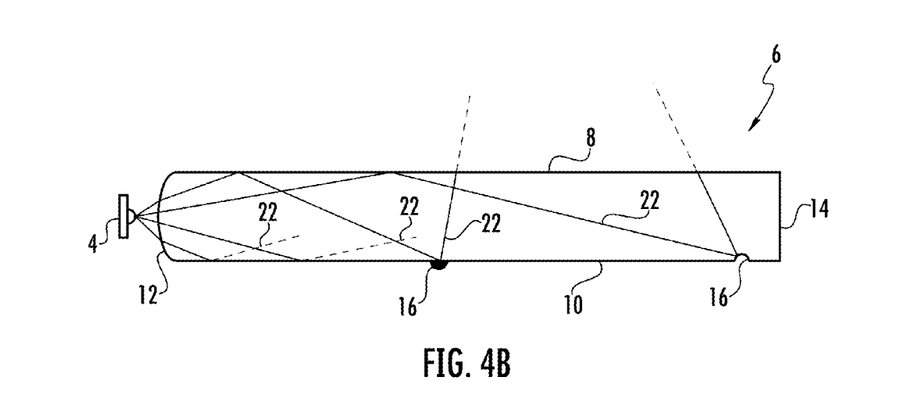

FIG. 4b shows a second cross-sectional view through the flat light distribution body 6 of FIG. 3. In particular, the cross-sectional view of FIG. 4b is orthogonal to the cross-sectional view of FIG. 4a. Further in particular, the cross-sectional view of FIG. 4b is in the viewing direction A-A, indicated in FIG. 4a. In the cross-sectional view of FIG. 4b, the flat light distribution body 6 is circumscribed by the back surface 10, the connection surface 14, the front surface 8, and the light entry surface 12.

In the cross-sectional plane of FIG. 4b, the light entry surface 12 has a convex shape. This convex shape provides for a refraction of the light emitted by the general illumination LED 4 and coupled into the flat light distribution body 6. This refraction is of such nature that the angle of incidence of the incoming light with respect to the front and back surfaces 8, 10 is larger than in the absence of the convex shape of the light entry surface 12. By making the angle of incidence larger, the incoming light can be conditioned in such a way that it is trapped in the flat light distribution body 6 and is propagated therethrough via total internal reflection. In the depicted particular embodiment, all light entering the flat light distribution body 6 has an angle of incidence of more than 60° with respect to the front and back surfaces 8, 10. The angle of incidence is defined with respect to the direction normal to the front and back surfaces 8, 10. In FIG. 4b, four exemplary light rays 22 are shown that illustrate the refraction at the light entry surface 12 and the propagation through the flat light distribution body 6 via total internal reflection.

The coupling out of the light out of the flat light distribution body 6 via surface irregularities 16 is now described. It is pointed out that surface irregularities may have a variety of shapes. Further, different kinds of surface irregularities may be provided. For illustrative purposes, one printed surface irregularity and one geometric surface irregularity, embodied as a hole, are shown in the exemplary embodiment of FIG. 4b. It is understood that the back surface 10 has a much greater number than those two depicted surface irregularities. However, for a clearer description of the functionality of the surface irregularities, only two are shown in FIG. 4b.

Each of the surface irregularities 16 has the effect that the light arriving at the surface irregularities 16 changes its path through the flat light distribution body 6 in a different manner as compared to light hitting the front and back surfaces 8, 10 at positions where no surface irregularities are present. In particular, the angle of reflection at such surface irregularities 16 is different from the angle of incidence, when looking at both angles with respect to the back surface 10. This is illustrated by two of the light rays 22 that are depicted as arriving at the surface irregularities 16 at angles of incidence of more than 60°. These light rays 22 leave the surface irregularities at angles of reflection that are much less than the angles of incidence with respect to the back surface 10. For the two depicted light rays, the angle of reflection is below 30°. As the angles of reflection are below the critical angle of the material of the flat light distribution body 6, these light rays 22 exit the flat light distribution body 6 at the next surface they hit, i.e. at the front surface 8. In this way, a coupling out of the light is achieved via the reflection at the surface irregularities 16.

FIG. 5 illustrates an exemplary process for designing a non-uniform distribution of surface irregularities 16 that allows for reaching a highly even output light intensity distribution of an exemplary aircraft interior light unit 2, when only the at least one general illumination LED is operated. In FIG. 5, an aircraft interior light unit 2 similar to the one shown in FIG. 2 is to be designed. The flat light distribution body 6 of the aircraft interior light unit 2 is shown from the backside. Accordingly, in the viewing direction of FIG. 5a, the back surface 10 of the flat light distribution body 6 and a general illumination LED 4 are visible. Further, a starting pattern of surface irregularities 16 is shown. In the exemplary embodiment of FIG. 5a, the starting pattern is a regular grid of surface irregularities 16.

Figure 5A:
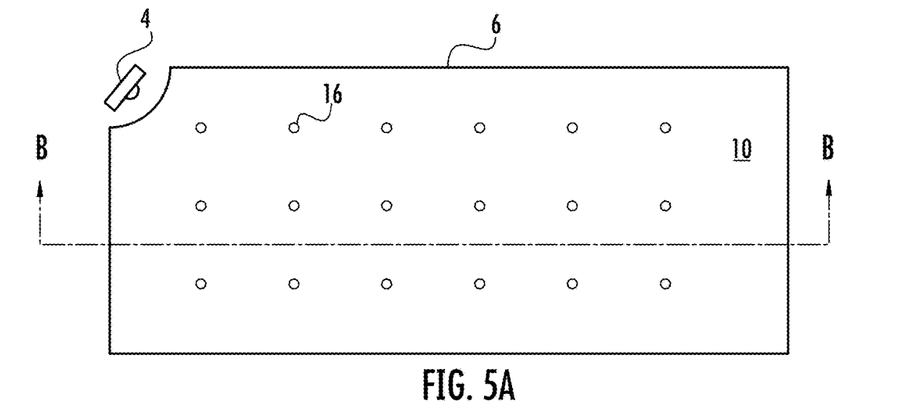

On the basis of the geometric extension and the material of the flat light distribution body 6, of the position of the general illumination LED 4 with respect to the flat light distribution body 6, and of the starting pattern of the surface irregularities, the operation of the aircraft interior light unit in a general illumination mode is simulated. Such simulation may be done via suitable computing means, such as a computer with suitable programs. As the result of such simulation, a luminance distribution across the front surface 8 may be computed.

Figure 5B:
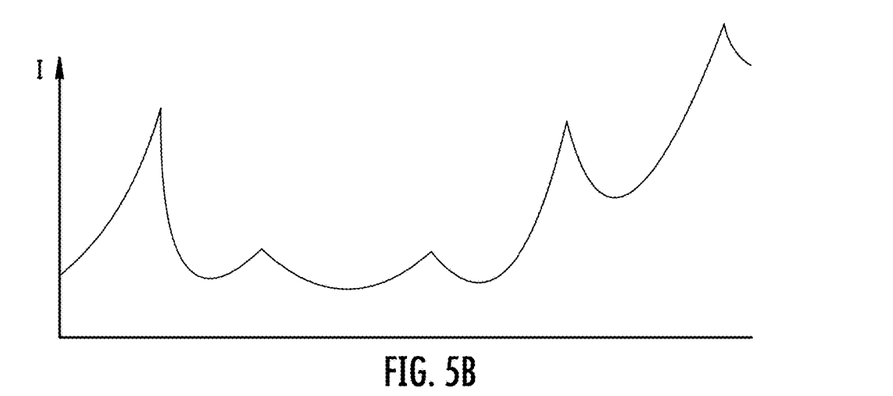

An exemplary extract of that luminance distribution is shown in FIG. 5b. In particular, the simulated luminance values along line B-B, depicted in FIG. 5a are shown in FIG. 5b. This extract of the luminance distribution has a ratio between its maximum luminance value and its minimum luminance value of about 10. Accordingly, the ratio of the maximum luminance value across the entire front surface and the minimum luminance value across the entire front surface is at least 10. It can be seen from the extract of the luminance distribution, depicted in FIG. 5b, that generally higher luminance values are output towards the right part of the distribution and that generally lower luminance values are output towards the left part of the distribution.

Figure 5C:
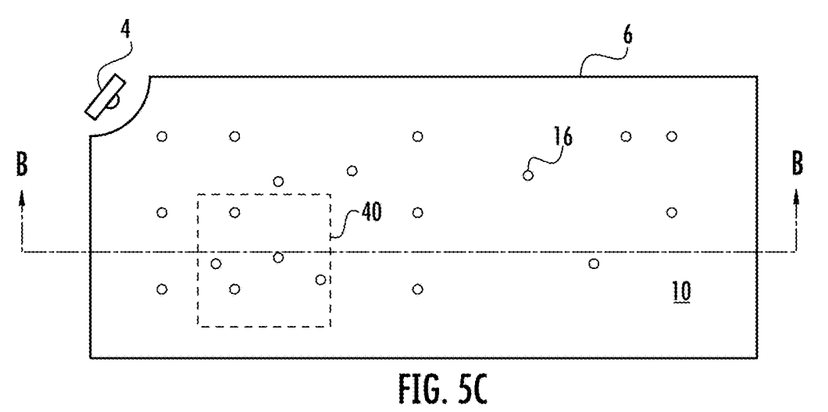

On the basis of these observations, the starting pattern of the surface irregularities 16 is adjusted. In particular, additional surface irregularities are provided slightly towards the left of the center of back surface 10, and surface irregularities are removed from the right end of the back surface 10. The resulting adjusted distribution of the surface irregularities 16 is illustrated in FIG. 5c.

Figure 5D:
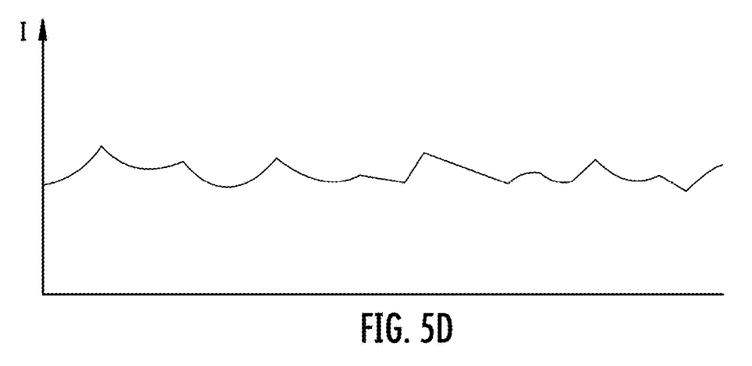
-FIG. 5D illustrates an exemplary embodiment of a method for designing a flat light distribution body to be used with aircraft interior light units in accordance with exemplary embodiments of the invention.

After this adjustment, the operation of the aircraft interior light unit is simulated again, as described above. The resulting luminance distribution differs from the starting luminance distribution. In FIG. 5d, an extract of this luminance distribution along line B-B is shown again. In the present case, the luminance distribution along line B-B has changed in such a way that the ratio between the maximum luminance value and the minimum luminance value is around 3. In this way, a much more even luminance distribution has been achieved by the adjustment of the distribution of the surface irregularities 16. In particular, in above discussed sub-regions towards the left of the center of the back surface 10, a substantially increased density of surface irregularities is provided. For example, the surface irregularity density in sub-region 40 is at least 50% higher than the average surface irregularity density across the whole back surface 10. It can also be said that the regional irregularity ratio in the sub-region 40 is at least 50% higher than the total irregularity ratio across the whole back surface 10.

It is pointed out that the method of designing the aircraft interior light unit, as illustrated in FIGS. 5a to 5d, is schematic and simplified. In reality, multiple iterations may be carried out in order to reach a desired luminance distribution across the entire front surface 8.

Further, it is pointed out that, instead of or in addition to changing the number of surface irregularities, the size of the surface irregularities can be adjusted. In particular, the size of the surface irregularities in regions with low luminance values can be increased and/or the size of the surface irregularities in regions with high luminance values can be decreased. Accordingly, the changing of the size/extension of the surface irregularities is an alternative means for adjusting the regional irregularity ratio.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft interior light unit having a light output over an extended light emission area, comprising:
    a flat light distribution body having a front surface, through which the light output is coupled out, and a back surface, wherein at least one of the front surface and the back surface of the flat light distribution body has a plurality of surface irregularities;
    at least one general illumination LED positioned at a lateral outside of the flat light distribution body, with light emitted by the at least one general illumination LED being coupled into the flat light distribution body and being propagated within the flat light distribution body via total internal reflection at the front and back surfaces and with light from the at least one general illumination LED being re-directed at the plurality of surface irregularities for being coupled out of the flat light distribution body and for providing a general illumination over the extended light emission area;
    a plurality of signalling LEDs being arranged outside of the flat light distribution body and facing towards the back surface of the flat light distribution body; and
    a translucent panel arranged between the back surface of the flat light distribution body and the plurality of signalling LEDs, with light emitted from the plurality of signalling LEDs passing through the translucent panel and the flat light distribution body, forming high luminance spots in the light output.

2. An aircraft interior light unit according to claim 1, wherein the back surface of the flat light distribution body has a plurality of surface irregularities, with light from the at least one general illumination LED being re-directed at the plurality of surface irregularities of the back surface for being coupled out of the flat light distribution body at the front surface thereof.

3. An aircraft interior light unit according to claim 1, wherein the translucent panel is reflective on its side facing the flat light distribution body and wherein the front surface of the flat light distribution body has a plurality of surface irregularities, with light from the at least one general illumination LED being redirected at the plurality of surface irregularities of the front surface for being coupled out of the flat light distribution body at the back surface thereof, for being reflected at the translucent panel, and for being passed through the flat light distribution body and out of the front surface thereof.

4. An aircraft interior light unit according to claim 1, wherein the translucent panel is a diffuse reflector, in particular a white diffuse reflector, on its side facing the flat light distribution body.

5. An aircraft interior light unit according to claim 1, wherein the translucent panel diffusely passes light emitted by the plurality of signalling LEDs.

6. An aircraft interior light unit according to claim 1, wherein the high luminance spots have an extension of at least 2 mm, in particular of between 5 mm and 10 mm, in the extended light emission area.

7. An aircraft interior light unit according to claim 1, wherein the translucent panel passes between 1% and 10%, in particular between 2% and 5%, of the light emitted by the plurality of signalling LEDs.

8. An aircraft interior light unit according to claim 1, wherein a luminance of the high luminance spots in the light output is between 2 times and 10 times as high as a luminance generated by the at least one general illumination LED in the light output.

9. An aircraft interior light unit according to claim 1, wherein the translucent panel is made of rigid foam material.

10. An aircraft interior light unit according to claim 1, wherein a distribution of the plurality of surface irregularities is such that a luminance distribution of the light output across the extended light emission area, generated by the at least one general illumination LED, has a ratio between its maximum luminance value and its minimum luminance value of at most 3.

11. An aircraft interior light unit according to claim 1, wherein the plurality of surface irregularities comprises surface holes and/or wherein the plurality of surface irregularities comprises dots attached to the at least one of the front and back surfaces.

12. An aircraft interior light unit according to claim 1,
    wherein the plurality of signalling LEDs are arranged in a set manner such that the high luminance spots convey predetermined signalling information to an aircraft passenger and/or aircraft crew member upon operation of the plurality of signalling LEDs, or
    wherein the plurality of signalling LEDs are arranged in a grid and wherein the plurality of signalling LEDs are individually controllable, with the aircraft interior light unit being capable of providing different signalling information to an aircraft passenger and/or aircraft crew member via selective operation of different subsets of the plurality of signalling LEDs.

13. An aircraft interior light unit according to claim 1, wherein the high luminance spots form at least one of a wash room usage sign, a fasten seat belt sign, a non-smoking sign, and a letter arrangement.

14. An aircraft, such as an air plane or a helicopter, having at least one aircraft interior light unit according to claim 1, disposed in an interior of the aircraft for providing general illumination and for conveying signalling information to an aircraft passenger and/or aircraft crew member.

15. A method of operating an aircraft interior light unit having a flat light distribution body with a front surface and a back surface, wherein at least one of the front surface and the back surface has a plurality of surface irregularities, at least one general illumination LED positioned at a lateral outside of the flat light distribution body, a plurality of signalling LEDs arranged outside of the flat light distribution body and facing towards the back surface thereof, and a translucent panel arranged between the back surface of the flat light distribution body and the plurality of signalling LEDs, the method comprising the steps of:

providing a general illumination over an extended light emission area by operating the at least one general illumination LED, with light from the at least one general illumination LED being coupled into the flat light distribution body, being propagated therein via total internal reflection, and being re-directed at the plurality of surface irregularities for being coupled out of the flat light distribution body; and     providing signalling information to an aircraft passenger and/or air crew member by operating the plurality of signalling LEDs, with light emitted from the plurality of signalling LEDs passing through the translucent panel and the flat light distribution body, forming high luminance spots that jointly contain the signalling information.

* * * * *